United States Patent Office 3,376,014
Patented Apr. 2, 1968

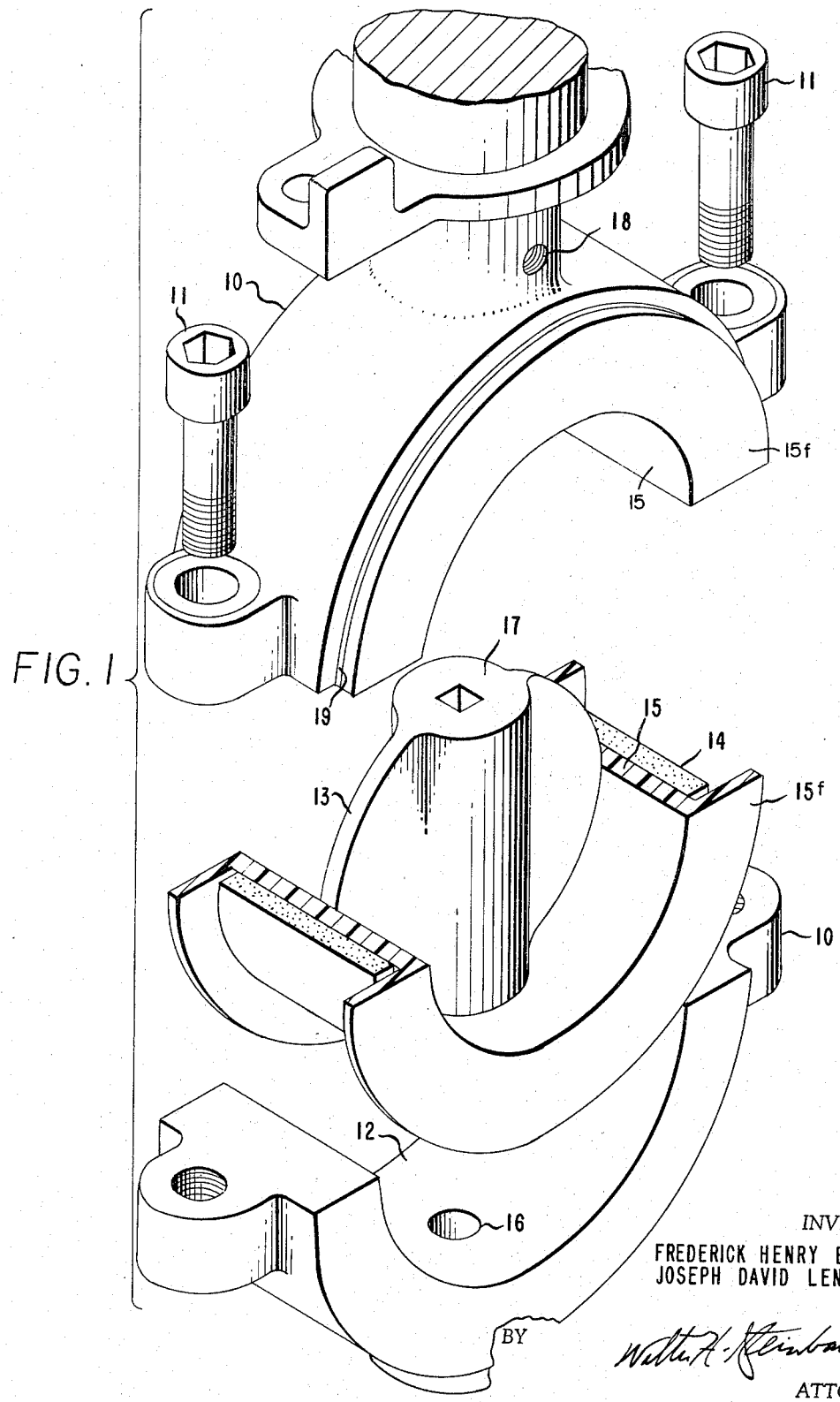

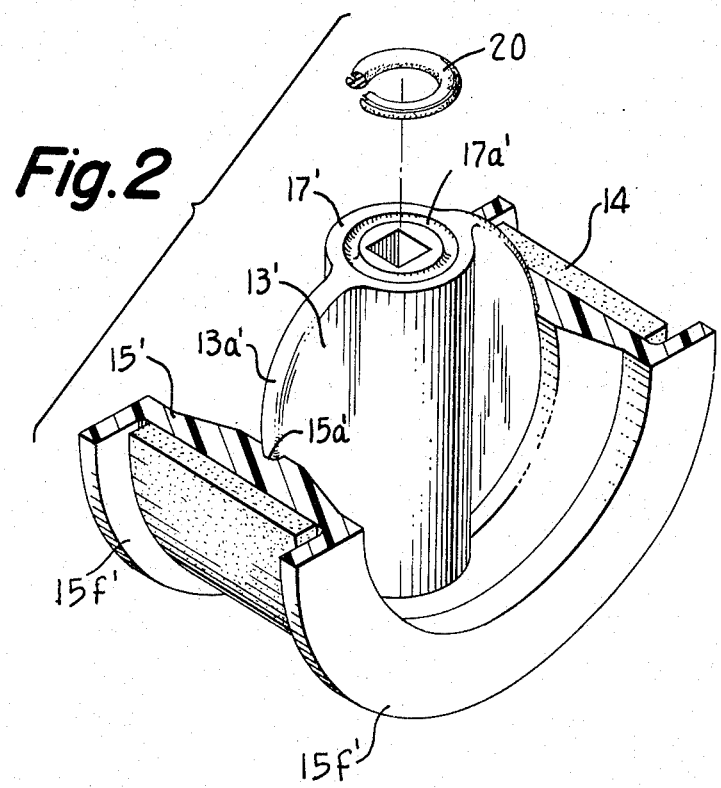

3,376,014
REPLACEABLE SUBSTANTIALLY RIGID FLUOROCARBON RESIN VALVE UNIT FOR USE IN BUTTERFLY VALVES
Frederick Henry Buckley, Woodstown, N.J., and Joseph David Lengyel, Newark, Del., assignors, by mesne assignments, to Garlock Incorporated, Palmyra, N.Y., a corporation of New York
Filed Mar. 9, 1965, Ser. No. 438,181
3 Claims. (Cl. 251—306)

ABSTRACT OF THE DISCLOSURE

A butterfly valve device having a replaceable resilient backed substantially rigid fluorocarbon resin valve liner and a pivoted fluorocarbon resin encapsulated butterfly disc.

---

The present invention is directed to butterfly valves having a replaceable fluorocarbon resin valve liner and disc unit.

Fluid handling equipment for the process industry is under constant demand for both increased corrosion resistance and higher pressure tolerances. One means to meet this demand is to coat or line structures of ordinary materials with layers having superior corrosion resistance. The success of this practice is evidenced by the existence of large quantities of heavy lined pipes, vessels, fittings, and valves in use today. Of the more resistant lining materials, fluorocarbon resins are quite widely used. Fluorocarbon coatings are especially desirable for the protection of the more intricate and relatively expensive fluid regulating valves. Some types of valves have been successfully coated or lined with fluorocarbon resins, one notable exception being the butterfly type valve.

Until the significant and unique results achieved by the present invention, certain structural problems in connection with coating or lining the butterfly valve with fluorocarbon resin had not been overcome.

It is, therefore, an object of the present invention to provide, for the first time, an all fluorocarbon resin butterfly valve unit, which unit is replaceable, for use in butterfly valve housings.

These and other objects of the invention will be apparent from the following description and claims.

More specifically, the present invention is directed to a replaceable substantially rigid fluorocrabon resin valve unit for use in butterfly valves, said unit comprising (A) a substantially uniform resilient ring-backed substantialy rigid fluorocarbon resin valve liner and (B) a centrally positioned substantially rigid fluorocarbon resin encapsulated butterfly disc pivotally positioned internally on the diameter of said liner, the pivotal surfaces of contact between said liner and said disc effecting a pressure sealing of the bore of said valve liner when the perimeter of said disc is pivoted to and maintained at right angles to the axis of said bore to effect continuous pressure contact with the internal surface of said valve liner, said radii of said disc being slightly greater in dimension than the corresponding internal radii of the plane of contact of said liner bore.

It is understood that certain modifications of the heretofore described novel butterfly valve unit are part of the present invention. For example, slotted "O" rings may be utilized, in appropriate pivotal disc grooves to effect the desired pivotal seal between the disc member and the liner bore. Other practical and equivalent modifications are also considered to be part of this invention.

Butterfly valves are important in the chemical industry because of their low resistance to flow and their simplicity of construction, ease to repair, light weight, compactness of size and relatively low cost.

A butterfly valve, in general, consists of a body part forming a bore passage and a disc-like member which is pivoted on a shaft to either open or close said bore passage. In the closed position, some varieties of butterfly valves depend upon a closely machine, matching fit between the rim of the disc and the inside body area to minimize leakage. In other models, an elastomeric seal between the body and disc is utilized to effect a tight, leak-free fit. One such modification of this latter type utilizes an elastomeric lining to the valve body for this seal. Direct substitution of a fluorocarbon resin for the body linear does not afford an adequate seal with the disc in the closed position because of the low resiliency of fluorocarbon resins in general. As a result, a satisfactory, fully fluorocarbon resin lined butterfly valve has not been available until that of the present invention.

The present invention provides a butterfly valve with a replaceable, substantially rigid fluorocarbon resin valve liner and disc, the valve having a substantially uniformly resilient backing ring member, such as a strip of elastomeric material, positioned between the inside valve body bore and a fluorocarbon linear, this elastomeric strip having sufficient compressibility and resilience to achieve an effective seal between the fluorocarbon resin encapsulated disc and fluorocarbon resin liner. Representative cured elastomer materials having the necessary resiliency and compression characteristics to assure a leak-proof seal include natural rubber, silicone rubber, butyl rubber, neoprene, "Viton" fluoroelastomers, "Hypalon" synthetic rubber, "Nordel" hydrocarbon rubber, buna-N, buna-S, and the like. Additional substantially uniformally resilient backing-ring means include fabricated ring materials composed or constructed of metallic and/or nonmetaillic materials which can be made to function in a manner similar to the elastomeric backing-ring heretofore described. More specifically, the following ring structure materials may be utilized:

(a) Compression pads made up of multiple compression (metallic) springs;
(b) Pneumatic pads;
(c) "Teflon" laminates of unsintered "Teflon" sandwitched between sintered "Teflon" sheets, i.e., the commercial product "Flexon"; and
(d) Various structures such as pile or flock; crossed or "brushpile"; cellular or closed cell foam; unit coil springs set in a deformable structure (e.g. mattress-like); pneumatic structures, e.g. bladder filled with air, a permanent gas or a "liquid spring" fluid and properly restrained rows of coil springs in a deformable structure.

Representative substantially rigid fluorocarbon resins which may be utilized as the valve liner and disc molded cover include polytetrafluoroethylene, fluoroethylene propylene, polychlorotrifluoroethylene, and vinylidene fluoride resins and copolymers and the like. In addition, other polymeric materials may be utilized such as polyethylene, polypropylene and vinyl polymers.

The elastomeric ring backing, for example, may be of silicone elastomer stock—Hardness Type A, Durometer of 70, plus or minus 5; this particular elastomer withstands a constant temperature of 500° F. In general, the particular elastomer utilized will be cured and have a Type A Durometer of approximately 50 to 85; the temperature of operation as well as Durometer property will determine which elastomer is selected.

This elastomeric backing-ring which may be utilized in the present invention is held in place by the friction between the liner and the valve housing; this backing consists of one or more strips of the elastomer forming a partial or complete uniform ring. This backing is not bonded or adhered to the valve liner. The unique function of this elastomeric or other resilient ring means is to provide the amount of flexibility in the fluorocarbon resin liner essential to achieving a high pressure seal when the perimeter of the disc is pivoted into contact with the liner bore.

In the absence of this elastomeric ring or other substantially uniformally resilient ring means, the metallic valve housing being in uniform and direct pressure contact with the valve liner, there is not sufficient flexibility of the liner due to its substantially rigid characteristics and an effective high pressure sealing of the liner bore is thus not achieved. The fluorocarbon resin encapsulated disc may be of any suitable metallic material having the required strength meeting the operating demands; examples of such materials include carbon and stainless steels, Monel, Inconel, Hastelloy and the like. The fluorocarbon resin is applied to the disc by encapsulation to obtain practical thickness and meet the required dimension factor.

For a more detailed explanation of the invention and for further objects and advantages thereof, reference is to be had to the following description taken in conjunction with the accompanying drawings in which:

FIG. 1 is an exploded perspective view of a butterfly valve embodying the present invention; and FIG. 2 is a fractional perspective view of a modification of the present invention.

The valve housing means is represented in the preferred embodiment set forth in FIGURE 1 of the attached drawing; the valve body is split horizontally across its diameter. Some minor adjustability of the fit between the disc member and the valve liner may be attained by adjusting the tension on fastener 11. Further allowance for such an adjustment can be provided by machining the matching faces of the valve housing body halves 10 to slightly less than 180°.

In the accompanying drawing there is illustrated a preferred embodiment of the fluorocarbon resin valve unit of the present invention together with a typical valve housing, the valve housing comprising a valve body of two parts 10 which are held together by fastenings 11. The valve housing, in this illustration, has a cylindrical inside bore defined by wall 12. The fluorocarbon encapsulated disc is designated 13. The bore configuration will, of course, conform to that of the particular pipe or conduit involved.

The valve body is assembled as follows: A resilient, i.e. elastomeric, strip 14 is inserted in each half of the valve body cylindrical bores 12. A valve liner 15 of substantially rigid fluorocarbon resin is next added between the valve body halves 10 over the elastomeric strip 14. As shown in FIG. 1, the valve lining 15 is tubular, having radially extending flanges 15f at its opposite ends. The flanges 15f extend over the edges of the resilient strip 14 and overlap the corresponding ends of the valve body halves 10. The substantially rigid fluorocarbon resin encapsulated disc 13 is then inserted in its proper position inside lining 15 and the body halves 10 are positioned around the lining 15 and between it send flanges 15f. Valve stems, not shown, are inserted through opening 16 and through the lining 15 securing the disc 13 into its proper final position. Fasteners 11 are tightened to bring the assembly together. A retaining pin (not shown) is inserted into hole 18 to hold the upper valve stem in place. A similar arrangement (not shown) is used on the lower valve stem.

Sealing of the fluid stream from seepage around the valve stems is accomplished by the resin to resin sliding contact between the pivotal ends 17 and perimeter of the disc 13 with valve liner 15. An alternate sealing may be accomplished by modifying the disc pivotal ends 17', FIG. 2, with a circular groove 17a' into which substantially rigid fluorocarbon resin slotted O rings 20 are seated so that when positioned they butt against the valve liner 15'. Slotted O rings 20 are a preferred embodiment. These slotted O ring seals work extremely well against pressure, and are readily replaceable requiring only removal of the disc and valve stems.

Another alternate sealing means is that wherein a slotted pressure seal similar in design to the slotted O ring 20 is utilized; this alternate slotted pressure sealing means is an integral part of the valve disc.

The interaction between the disc and valve liner in forming or breaking a seal will now be described. In the closed position, the perimeter of the encapsulated disc 13 is held firmly in pressure contact with valve liner 15 to effect a tight seal. Upon turning of the disc, during an opening operation, the valve liner 15 distorts, mostly in flexure; the elastomeric ring 14 accepts the distorted position of the lining by being compressed. As the disc pivots out of the way, the elastomeric ring backed liner returns to its undistorted configuration. The valve closing operation takes place in the reverse manner until the disc perimter 13 is seated in pressure sealing contact with the valve liner.

Optionally, a washer component 19, as represented in FIGURE 1 may be utilized. A representative suitable washer material is commercial "Compressed Asbestos"; this material contains 75% asbestos, 15% binder and 10% clay.

A modification of the valve liner 15' which finds practical utility in the practice of this invention is one wherein the perimeter 13a' of the disc member 13' seals into a raised valve liner groove 15a' when pivoted to the closed position. This variation also takes advantage of the resilient backing-ring compression on distortion of the valve liner 15' with the additional benefit of effecting a wiping action on the perimeter 13a' of the disc 13' just before it seats in the raised liner groove 15a', this clears the disc perimeter 13a' of enlodged solids.

Prior to discovery of the present invention, butterfly valves were generally limited to an upper operating pressure limit of 200 p.s.i. because of the lack of holding ability of the valve seals. Now, a butterfly valve is provided which has demonstrated satisfactory sealing to pressures over 400 p.s.i.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A butterfly valve for handling corrosive fluids and having high corrosion resistance and high pressure tolerance comprising a valve body having a cylindrical bore, a substantially rigid fluorocarbon resin lining in said bore defining a flow passage through which corrosive fluids may pass, said lining having diametrically opposed openings aligned with similar openings in said valve body for receiving pivot means, a substantially uniformly resilient backing member positioned in said bore of said valve body between said valve body and said substantially rigid fluorocarbon resin lining, said lining being tubular and having end flanges extending radially outward over the edges of said resilient backing member and the ends of said valve body, a substantially rigid fluorocarbon resin encapsulated butterfly disc having pivotal ends pivotally positioning said disc within said substantially rigid fluorocarbon resin lining on the diameter passing through said aligned openings, and fluorocarbon resin sealing ring means positioned between each of said pivotal ends of said disc and the adjacent surfaces of said lining extending around said diametrically opposed openings therein sealing the fluid from seepage around said aligned openings, the pivotal surfaces of contact between said lining and said disc effecting a pressure sealing of the passage of said lining when the perimeter of said disc is pivoted to and maintained at a right angle to the axis of said passage to effect continuous pressure contact with the internal surface of said lining, the radii of said disc being slightly greater in dimension than the corresponding internal radii of the plane of contact of said passage through said lining.

2. A butterfly valve according to claim 1 wherein said fluorocarbon resin sealing ring means are positioned in circular grooves in said pivotal ends of said butterfly disc.

3. A butterfly valve according to claim 1 wherein said lining is provided with a raised valve liner groove on the internal surface thereof and the perimeter of said disc is adapted to seat into said groove.

References Cited

UNITED STATES PATENTS

| | | | |
|---|---|---|---|
| 2,657,896 | 11/1953 | Muller | 251—306 |
| 2,847,181 | 8/1958 | Muller | 251—306 |
| 3,073,336 | 1/1963 | Johnson | 251—317 X |
| 3,143,132 | 8/1964 | Pangburn | 251—306 X |
| 3,233,861 | 2/1966 | Stillwagon | 251—306 X |
| 3,241,806 | 3/1966 | Snell | 251—306 X |
| 3,072,139 | 1/1963 | Mosites | 251—306 |

FOREIGN PATENTS

| | | |
|---|---|---|
| 521,391 | 3/1955 | Italy. |

M. CARY NELSON, *Primary Examiner.*

R. C. MILLER, *Assistant Examiner.*